L. N. MEEK.
BEET AND VEGETABLE TOPPER.
APPLICATION FILED JAN. 25, 1916.
1,225,841.
Patented May 15, 1917.
3 SHEETS—SHEET 2.
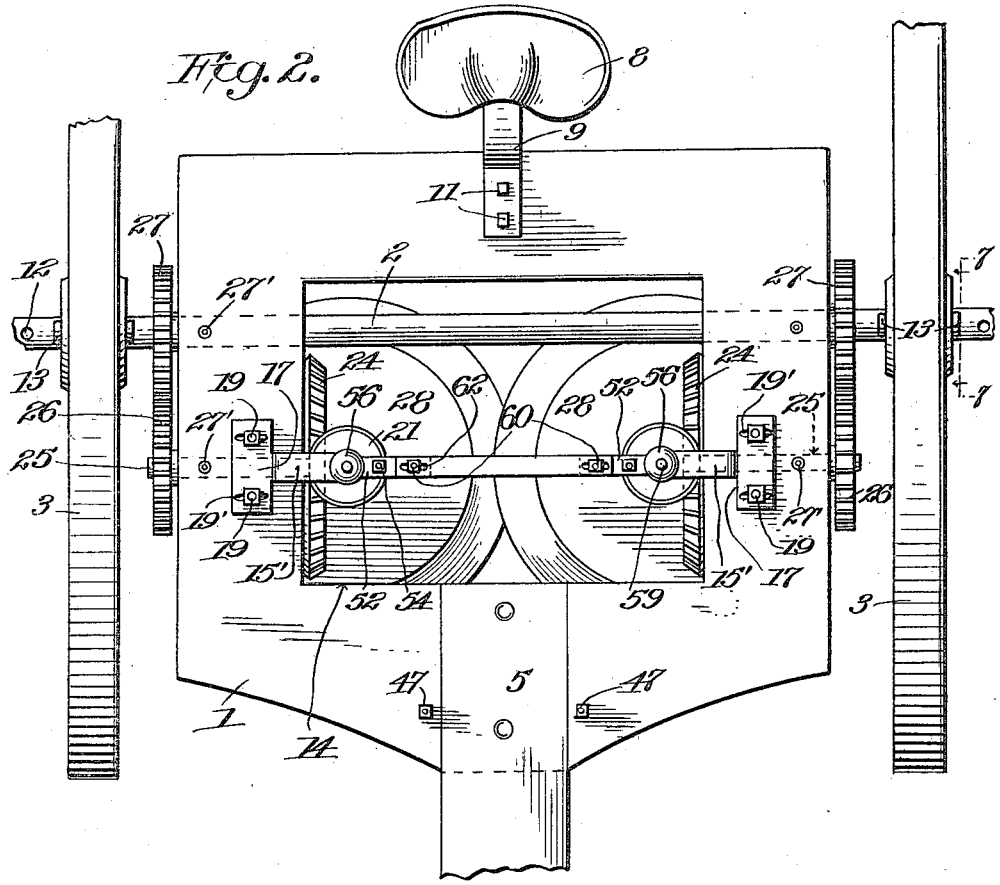
Fig. 2.
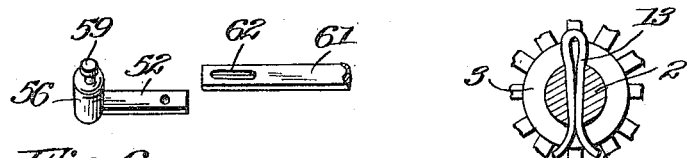
Fig. 6.
Fig. 7.
Inventor
L. N. Meek.

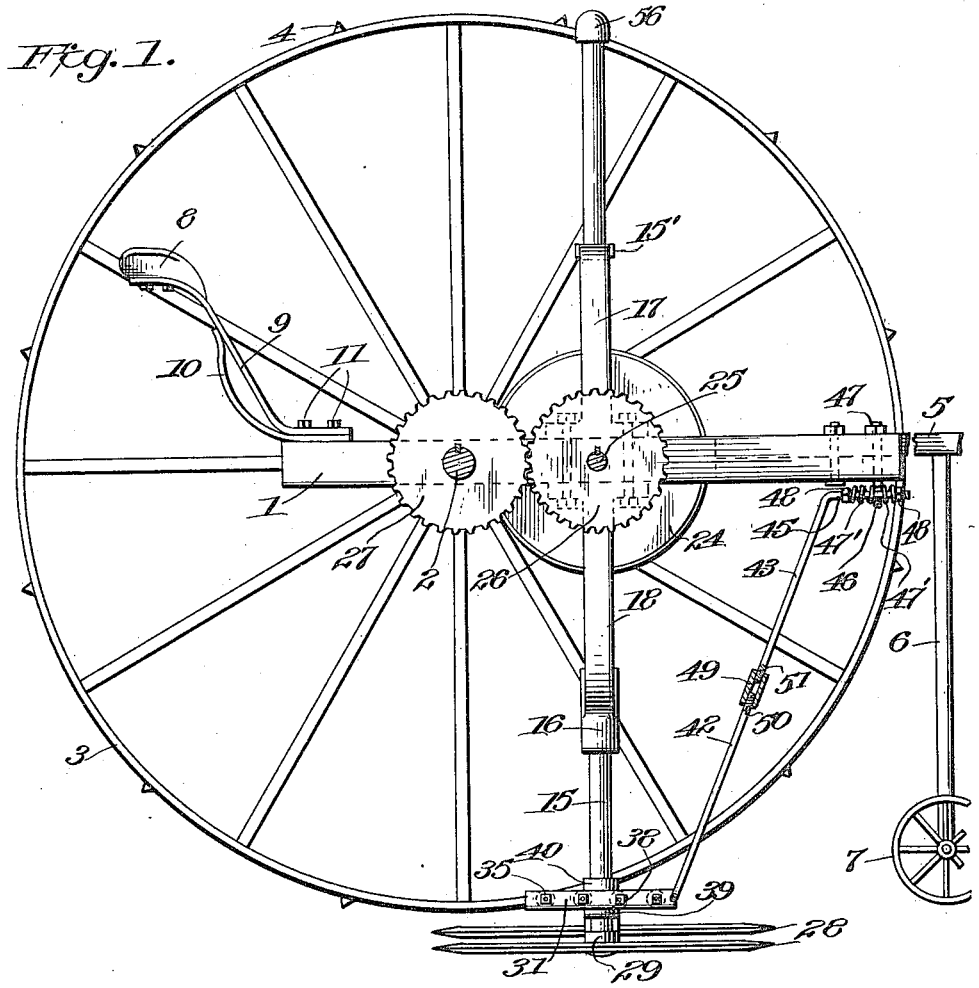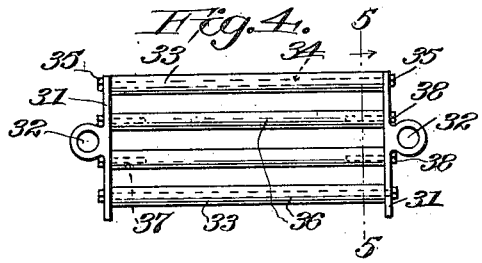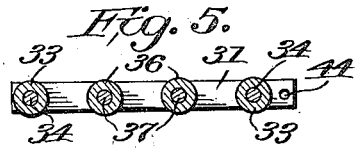

UNITED STATES PATENT OFFICE.

LAWRENCE NOBLE MEEK, OF SQUIRREL, IDAHO.

BEET AND VEGETABLE TOPPER.

1,225,841.  Specification of Letters Patent.  Patented May 15, 1917.

Application filed January 25, 1916. Serial No. 74,130.

*To all whom it may concern:*

Be it known that I, LAWRENCE N. MEEK, a citizen of the United States, residing at Squirrel, in the county of Fremont and State of Idaho, have invented certain new and useful Improvements in Beet and Vegetable Toppers, of which the following is a specification.

My invention relates to a machine for topping beets or other vegetables prior to the digging or plowing thereof.

The invention aims to provide a novel, durable and efficient construction improved generally but particularly with respect to topping means automatically adjustable vertically according to surface conditions; means which will maintain the topping mechanism in effective relation to the beets to be topped; means to regulate the depth of penetration of the cutting knives into the soil; to provide a latter means of such construction as to move over the soil without undue friction; means to drive the knives through movement of a shaft driven by ground-engaging wheels; means to brace the cutting knives and supporting means against spreading or undue lateral movement, and means to permit fastening and adjustment of the ground engaging wheels at different locations so that the machine may travel in paths of different widths.

Having in view the above objects, as well as additional objects such as will hereinafter appear, the invention has been embodied in one preferred form as illustrated in accompanying drawings, wherein:—

Figure 1 is a side elevation partly broken away;

Fig. 2 is a top or plan view partly broken away;

Fig. 4 is a plan view of the depth-regulating means coöperating with the cutter knives;

Fig. 5 is an enlarged cross sectional view on the line 5—5 of Fig. 4;

Fig. 6 is a fragmentary detail perspective view of parts of the anti-spreading device for the cutting means and Fig. 7 is a cross sectional view on the line 7—7 of Fig. 2.

Figure 3:
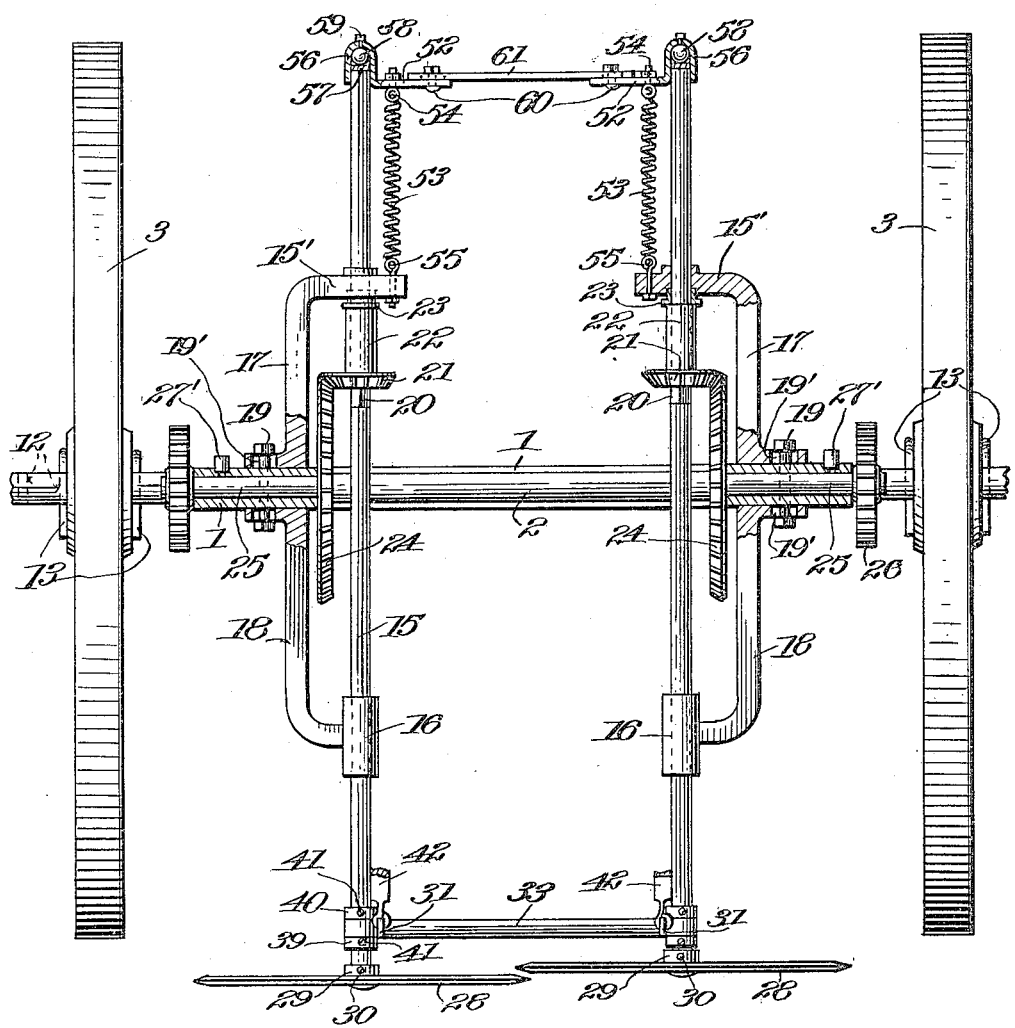
Fig. 3 is a front view having part of the main casting and other parts partly broken away.

Referring specifically to the drawings, a truck is employed having a main body or casting 1 in which a main shaft 2 is journaled and on which are mounted to turn therewith, a plurality of drive wheels 3 which, as evidenced by Fig. 1, may have traction spurs on their periphery, if preferred. From the front of the body 1 projects a suitable stub shaft 5 with which are associated supporting means 6 for front or colter wheels 7. At the rear an operator's seat 8 is mounted from the casting 1 by means of a spring bracket 9 which is reinforced by a spring 10 and both of which elements 9 and 10 are fastened to the casting as by means of set-screws 11. This form of truck is shown by way of example only, since my improvement may be embodied in any approved form.

While the wheels 3 turn with shaft 2, yet they are preferably adjustable longitudinally of the shaft so that the wheels may be disposed at different distances apart to accommodate work in rows of different widths. At different intervals shaft 2 is provided with apertures 12 through which removable cotter pins or the equivalent 13, see Figs. 2, 3 and 7, may be passed in order to form abutments for the hubs of the wheels and fasten them in the adjusted positions.

At approximately the center of the body 1, a large opening 14 is provided and extending therethrough adjacent the side walls thereof are vertical shafts 15 preferably passing through guide arms 15' and sleeves 16 of brackets 17 and 18, respectively, mounted above and below the body 1 and fastened thereto as by means of bolts 19 passing through elongated slots 19' permitting relative adjustment of shafts 15 and cutter carried thereby. It is obvious that these brackets 17 and 18, or bearings as they may well be termed, may be of any preferred construction and shape and fastened in any appropriate manner. Suitable gearing is employed to revolve shafts 15 through movement of the shaft 2 and to this end, shafts 15 are preferably provided with squared portions 20 which are surrounded by gear wheels 21 and through which said squared portions slide. The gear wheels 21 may have elongated sleeves 22 the upper ends of which are engaged by collars 23 fitting into an annular recess of arms 15' and serving to maintain the gear wheels 21 in operative relation with gear wheels 24. The latter gear wheels are disposed in the opening 14 intermediate shafts 15 and the side walls, and are preferably rigidly mounted on shafts 25 journaled in the body 1. At their outer ends, shafts 25 have gear wheels 26 keyed thereto and which mesh with gear wheels 27 keyed to the shaft 2. If desired, oil cups 27' may be fastened to plate or body 1 so as to supply oil or other lubricant to the shafts 2 and 25 where they pass through the body, for lubricating purposes.

Each shaft 15 at its lower end carries a topping knife which may be an annular disk or knife 28, removably secured to the shafts as by means of sockets 29 and removable set-screws 30. Means are provided to regulate the depth of penetration of the cutters into the soil as follows: 31 are side arms or brackets having openings 32 through which the shafts 15 pass and turn. Intermediate the brackets 31 are disposed elongated outer rollers 33 which are journaled on bolts 34 extending completely through the rollers and brackets and being fastened to the latter by means of nuts 35. Intermediate the rollers 33 are a suitable number of additional rollers 36. These additional rollers are preferably provided with short rods or trunnions 37 rigidly connected thereto and journaled in the brackets 31 and which may be provided with nuts 38 on the exterior thereof. When this device is in operative relation with the cutters, it is fastened against vertical movement by means of slidable collars 39 from below and slidable collars 40 from above. The collars 39 and 40 are adapted to be fastened against sliding movement through the engagement of set-screws 41 passing therethrough and binding against the shafts 15.

Brace means are preferably provided for the depth-regulating means described and which may consist of a rod formed in two sections 42 and 43, the former of which is pivotally connected to the brackets 31 by passage of specially shaped ends through apertures 44 of the brackets. Arm 43 preferably terminates in a horizontal portion 45 which passes through eyelets 46 of bolts 47 secured to the body 1. On opposite sides of the eyelets 46, coil springs 47' are disposed and fastened by means of nuts 48 on arm 45. The springs 47' permit yielding movement of the depth-regulating means as when an obstruction is encountered in the path of travel. In order to have the brace effectively serve at different vertical adjustments of the depth-regulating means, rods 42—43 may be lengthened or shortened through manipulation of a turn-buckle 49 engaging oppositely screw threaded portions 50 and 51 of rods 42 and 43 respectively.

Suitable means are employed in order to maintain the cutters in proper operative relation regardless of the surface conditions of the soil. To this end, presser arms 52 engage the shafts 15 at their tops and tend to pull the shafts downwardly urged by springs 53 fastened to eye bolts 54 on arms 52 and eye bolts 55 on arms 15'. Specifically arms 52 have hollow socket heads 56 into which the shafts 15 extend. At the top end of each shaft is disposed a loose washer 57 on which rests a bearing ball 58. The tops of the heads 56 are curved so as to conform to the shape of the balls 58 and preferably have removable set-screws 59 therein covering openings which may be exposed on removal of the set-screws to permit lubrication of the balls and disks.

Arms 52 may serve as parts of bracing or anti-spreading means for the shafts 15 and cutters and to this end are preferably connected as by means of bolts 60 to a connecting bar 61. Bolts 60 pass through elongated slots 62 of the connecting bar 61, and which slots, permit relative adjustment of the shafts 15.

In use, the truck is drawn by any suitable draft means which action causes the wheels 3 to turn and in turn to rotate shaft 2 which, through the medium of gear wheels 27, 26, shafts 25, gear wheels 24 and 21, turn the shafts 15. Previously the depth regulating means for the cutters 28 have been placed at the proper adjustment and fastened by means of the collars 39 and 40 and set-screws 41. These means are braced by the rods 42 and 43, which yield upon the means receiving undue shocks, against the tension of springs 47'. The cutters 28 penetrate the soil and sever the tops or leaves from the beets, through the rotary action of the knives 28, it being understood that the rollers 33 rest on the soil and limit the depth of penetration of the knives and move or travel without undue friction. Balls 58 and disks 57 serve to prevent binding or injurious action at the connections of arms 52 with shafts 15, and the springs 53 serve to maintain the knives 28 in effective operating position, since the springs force the shafts 15 and knives downwardly.

Since merely the preferred embodiment has been illustrated and described, it is to be understood that changes in the details of construction, arrangement and combination of the parts, may be resorted to within the spirit and scope of the invention.

I claim:

1. A topping machine having a topping member, means to support said member for vertical movement, a presser member for the topping member having a bearing head therefor and a spring connected to said presser member and supporting means to urge the topping member downwardly.

2. A topping machine having a topping member, a supporting member, a shaft for said topping member movable vertically through said supporting member, means to drive said shaft, a presser member for said shaft and a spring associated with said supporting member and presser member to urge the shaft and cutter member downwardly.

3. A topping machine having topping members, shafts, brackets supporting said shafts for vertical yielding movement, means to drive said shafts, presser members engaging the tops of said shafts, friction reducing means intermediate the ends of said shafts and presser members, connecting means for said presser members, and a spring associated with one of said presser members and one of said brackets to urge the shafts and cutters downwardly.

4. A topping machine having topping members, shafts, one on each of said members, a supporting body, brackets extending upwardly from said body and supporting said shafts, brackets extending downwardly from said body and supporting said shafts, and fastening bolts, each common to one of said brackets supported above and one of said brackets supported below the body.

5. An agricultural machine having a tool, a supporting shaft, a body, means to mount said shaft from said body, means on said shaft to limit the depth of penetration of said tool into the soil, a brace member pivoted to said last mentioned means, said member having a substantially horizontal portion, an eye member carried by the body through which said substantially horizontal portion passes, springs, one on each side of said eye member, and fastening members on said portion to prevent displacement of said springs and serve as abutments therefor.

6. A topping machine having a body, said body being provided with an opening, shafts extending vertically through said opening, gear wheels disposed in said opening, gear wheels meshing with the first mentioned gear wheels mounted on said shafts, topping means carried by said shafts, brackets mounted on said body serving as bearings for said shafts, presser members, one for each shaft, springs associated with said brackets and said presser members serving to depress the shafts, connecting means for the presser members, horizontal shafts mounted in said body and carrying the first mentioned gear wheels, third gear wheels, the latter gear wheels being mounted on said horizontal shafts, gear wheels meshing with the latter gear wheels, a shaft on which the last mentioned gear wheels are mounted and traction means in which said shaft is supported.

In testimony whereof I affix my signature.
LAWRENCE NOBLE MEEK.

Copies of this patent may be obtained for five cents each, by addressing the "Commissioner of Patents, Washington, D. C."